United States Patent
Schenk et al.

(10) Patent No.: US 10,261,456 B2
(45) Date of Patent: Apr. 16, 2019

(54) METHOD FOR AUTOMATED PROCESS CONTROL OF A DIGITAL PRINTING MACHINE

(71) Applicant: HEIDELBERGER DRUCKMASCHINEN AG, Heidelberg (DE)

(72) Inventors: Stefan Schenk, Wiesenbach (DE); Nikolaus Pfeiffer, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/873,123

(22) Filed: Jan. 17, 2018

(65) Prior Publication Data
US 2018/0203393 A1    Jul. 19, 2018

(30) Foreign Application Priority Data
Jan. 17, 2017   (DE) .......................... 10 2017 200 609

(51) Int. Cl.
*G06F 3/12*      (2006.01)
*G03G 15/00*     (2006.01)

(52) U.S. Cl.
CPC ..... *G03G 15/5083* (2013.01); *G03G 15/5016* (2013.01); *G03G 15/5062* (2013.01); *G06F 3/1204* (2013.01); *G06F 3/126* (2013.01)

(58) Field of Classification Search
CPC ............ G03G 15/5083; G03G 15/5016; G06F 3/1204; G06F 3/126
USPC ........................................................ 358/1.15
See application file for complete search history.

(56) References Cited

U.S. PATENT DOCUMENTS

| | | | |
|---|---|---|---|
| 8,711,380 B2 | 4/2014 | Burry et al. | |
| 2007/0227389 A1* | 10/2007 | Huber | B41F 33/0036 101/484 |
| 2008/0144067 A1* | 6/2008 | Burry | H04N 1/2307 358/1.13 |
| 2014/0192358 A1* | 7/2014 | Barbieri | G01J 3/0291 356/402 |

* cited by examiner

*Primary Examiner* — Neil R McLean
(74) *Attorney, Agent, or Firm* — Laurence A. Greenberg; Werner H. Stemer; Ralph E. Locher

(57) ABSTRACT

A method for automated process control of a printing machine system by using a computer includes the steps of applying a set of rules including process parameters to be examined by the computer to detect whether and when process control is required. The values of the process parameters are made available to the computer by respective responsible components of the printing machine system. The computer is used to implement process control and the computer is used to evaluate process control results. The computer is used to implement actions that are deemed necessary based on the evaluation of the results and the computer is used to save the established data of the implemented process control.

9 Claims, 5 Drawing Sheets

METHOD FOR AUTOMATED PROCESS CONTROL OF A DIGITAL PRINTING MACHINE

CROSS-REFERENCE TO RELATED APPLICATION

This application claims the benefit, under 35 U.S.C. § 119, of German Patent Application DE 10 2017 200 609.9, filed Jan. 17, 2017; the prior application is herewith incorporated by reference in its entirety.

BACKGROUND OF THE INVENTION

Field of the Invention

The present invention relates to a method for automated process control in a digital printing machine system by using a computer.

The technical field of the invention is the field of digital printing.

Setting up, calibrating and operating a complex machine system such as that of a digital printing machine, in particular an inkjet printing machine, requires a plurality of parameters to be considered. The prior art includes various approaches to this process of efficiently setting up a printing machine, for instance in terms of preparing for a new print job. Those approaches substantially include the implementation of manual process control, caused and initiated by a human operator, and/or a default implementation of process control before the start of every print job. In that process, some or all of the required setting parameters and influencing parameters of the digital printing machine are checked and potentially necessary steps, for instance recalibration steps, are taken to correct the relevant parameters. However, those different approaches are dependent on the knowledge and experience of the human operator and are frequently very inefficient as a consequence. The default implementation of process control for every new print job is very complex and time-consuming. Another disadvantage is that in some cases it may not be necessary at all. That presents a massive potential for improvement.

A known improved process control approach for digital production printing is known as the Barbieri DOC solution which discloses such process control developed by the Barbieri Company. In that process, a mobile measuring device is used to examine the print result in terms of the achieved color fidelity. Using that mobile measuring device at regular intervals thus allows an ongoing printing process to be monitored in terms of whether the color output continues to be within predefined tolerances. If that is not the case, a suitable warning is generated and output to the operator of the printing machine, giving the operator the opportunity to counteract the defect by recalibrating the machine in a suitable way and/or by modifying other settings of the printing machine. Nevertheless, a disadvantage of that process is that it is the development of only one parameter of the printing machine system, namely color fidelity—albeit a very important parameter—that is continuously monitored. Other important parameters such as the operating time that has elapsed since the last calibration of the printing machine system or the printing speed, etc. are not taken into consideration.

Another approach, known from U.S. Pat. No. 8,711,380, is to implement an automated printing machine system calibration process based on the contents of the print jobs pending on the printing machine system to be controlled. That document discloses carrying out an automated assessment of print job data or image data present in the print job data for potentially useful information in terms of the calibration of the printing machine. In that process, the image data of the pending print job/s is/are analyzed, namely in the context of influencing parameters of a print model, in order to achieve improved print quality by using that print model. The data that have been analyzed in that way refer to information about the start-up of the printing machine, the operation, and maintenance cycles in terms of the current print job in question. Nevertheless, a disadvantage of that approach is that only data that are related to the current print job are examined whereas general information and statuses of the printing machine system are not taken into closer consideration. The printer output, i.e. the quality of the print results of the printing machine, is also not included in the analysis for process control purposes.

SUMMARY OF THE INVENTION

It is accordingly an object of the invention to provide a method for automated process control of a digital printing machine, which overcomes the hereinafore-mentioned disadvantages of the heretofore-known methods of this general type and which allows a digital printing machine system to be operated much more efficiently in particular in terms of setting up the printing machine system.

With the foregoing and other objects in view there is provided, in accordance with the invention, a method for automated process control of a printing machine system by using a computer, which comprises the steps of applying a set of rules including process parameters to be examined by the computer to detect whether and when process control is required, wherein the values of the process parameters are made available to the computer by the respective responsible components of the printing machine system, as well as implementing process control by using the computer, as well as evaluating the process control results by using the computer, as well as implementing actions that are deemed necessary based on the evaluation of the results by using the computer, and saving the established data of the implemented process control by using the computer. A first step and core element of consequence in this process is the use of a set of rules available on the computer in digital form. Based on this set of rules, the control unit may decide whether process control is currently necessary at all for the printing machine system to be controlled. The set of rules thus includes various input parameters based on which the control unit may make a decision on process control. The decisions may be that partial process control is required, i.e. only certain measures need to be taken, that a complete process control including the implementation of all required process control measures is required, or that no process control is required. In the latter case, an automated adaption of the existing process parameters, i.e. of the present input variables, is sufficient. If, by applying the set of rules, the computer comes to the conclusion that partial or complete process control is necessary, process control is carried out accordingly by the computer. Subsequently, the process control results are evaluated by the control unit. Based on the process control results and the evaluation thereof by the computer, the computer may then immediately implement the actions that are accordingly required and are directly dependent on the evaluation of the results. The last step is to save the established data of the implemented process control, for instance the evaluated results as well as the implemented actions, by using the computer. The presented method of the invention aims at ensuring that process control, which is time-consuming and complex in terms of the computational effort involved, is carried out only when it is definitely required, thus reducing the process control effort to a minimum, in particular the actions that need to be implemented after process control.

Advantageous and preferred further developments of the present invention will become apparent from the associated dependent claims as well as from the description and the associated drawings.

In accordance with another preferred mode of the invention in this context, the process parameters result from the operation of the printing machine system and include parameters such as the operating time elapsed since the last calibration of the printing machine system, the used printing substrate, the used ink, the applied drying power, the printing speed, the type of corona, the type of pinning, and the output color values of the printing machine system. The listed process parameters form the input parameters for the set of rules based on the application of which the control unit decides on the necessity of process control. Which process parameters are applied for the set of rules and how they are weighted relative to one another may be configured in a suitable way. The decision depends on the circumstances of the printing machine system to be examined.

In accordance with a further preferred mode of the invention in this context, the output color values of the printing machine system are established by a color measurement device in the context of the color management process of the printing machine system. The output color values of the printing machine system need to be established in a suitable way by a color measurement device. If the printing machine system is equipped with a built-in inline color measurement device for automated color management purposes, it goes without saying that this is the preferred color measurement device to be used. If a manual mobile color measurement device is used or another color measurement device that is outside the printing machine system, these measurement devices are used accordingly. An important aspect in this context is to keep the effort for establishing the output color values of the printing machine system as low as possible. This is done in that the results of the output color value measurement process that are taken anyway in a color management context of the printing machine are also used in the automated process control.

In accordance with an added preferred mode of the invention in this context, the responsible components of the printing machine system are components such as the color measurement device, the drier, the materials management unit, the ink supply, the corona unit, and the pinning unit. The process parameters that represent the input parameters of the set of rules but may not be established by the computer itself—such as the operating time since the last calibration of the printing machine system—need to be established by the components that are responsible for the establishment of these process parameters and need to be forwarded to the control unit.

In accordance with an additional preferred mode of the invention in this context, the data established in the course of every process control that is carried out are saved by the computer in a data set in a database and the established data include values such as process parameters, ICC profiles used in the context of color management, and calibration data for the printing machine system as well as updates of the set of rules. The data established for every process control are saved by the control unit in a data set in a database.

In accordance with yet another preferred mode of the invention in this context, if the computer does not carry out process control after the application of the set of rules when process parameters have changed, all existing data sets of previous process controls are adapted to the modified process parameters by the computer. If the decision is made that no process control needs to be implemented after the step of applying the set of rules, which is usually initiated by modified process parameters, because the effects of the modified process parameters is calculable or simulatable, the existing data sets of previously implemented process controls need to be adapted by the computer to the process parameters that have been modified accordingly.

In accordance with yet a further preferred mode of the invention in this context, the process control carried out by the computer includes the steps of loading required test pages or individual test elements, outputting the test pages or individual test elements in an automated or semi-automated way, and measuring and evaluating the generated print output in an automated or semi-automated way. The aforementioned actions are the steps that need to be taken for the actual process control.

In accordance with yet an added preferred mode of the invention in this context, the evaluation of the process control results by using the computer includes the step of comparing actual and nominal values of the process parameters, wherein sensitivities for the actual values and tolerances for the nominal values are taken into consideration. In this context, the process control evaluation includes a nominal/actual comparison for the relevant process parameters. In this process, sensitivities for the input parameters corresponding to the process parameters are taken into consideration. This means that the input variables are adapted in a suitable way by preselecting the values and/or accordingly weighting the input variables. In addition, the nominal values for the process parameters have corresponding tolerances.

In accordance with yet an additional preferred mode of the invention in this context, the evaluated process control results for all process parameters are saved and optionally displayed on a display and the fact that the tolerances have been met is saved and/or displayed on the display in a corresponding way. The result of the nominal-actual comparison for the process parameters is co-saved in a corresponding way, and for all process parameters it is indicated whether they meet the corresponding nominal values i.e. have passed process control or not. Optionally, this may likewise be displayed on a display to be seen by the operator of the printing machine system.

In accordance with a concomitant preferred mode of the invention in this context, the required actions after process control include actions such as correcting the process parameters, recalculating the calibration processes carried out in the course of the process control, recalculating ICC profiles used in color management, as well as outputting the information that a printing operation using the current process parameters is impossible. Depending on the results of the process control evaluation, specific actions are required. This, for instance, includes correcting machine parameters or recalculating the calibration as well as the ICC profiles for color management. Another possible action is to display the information that printing is impossible with the current settings and/or at the current condition of the printing machine or would not lead to the desired outcome. In sum the aforementioned actions relate to settings modifications on the printing machine system in question that are necessary to enable the continuation of the current printing operation based on the defined requirements or display the impossibility thereof.

Other features which are considered as characteristic for the invention are set forth in the appended claims. The invention as such as well as further developments of the invention that are advantageous in structural and/or functional terms will be described in more detail below with reference to the associated drawings and based on at least one preferred exemplary embodiment.

Although the invention is illustrated and described herein as embodied in a method for automated process control of a digital printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
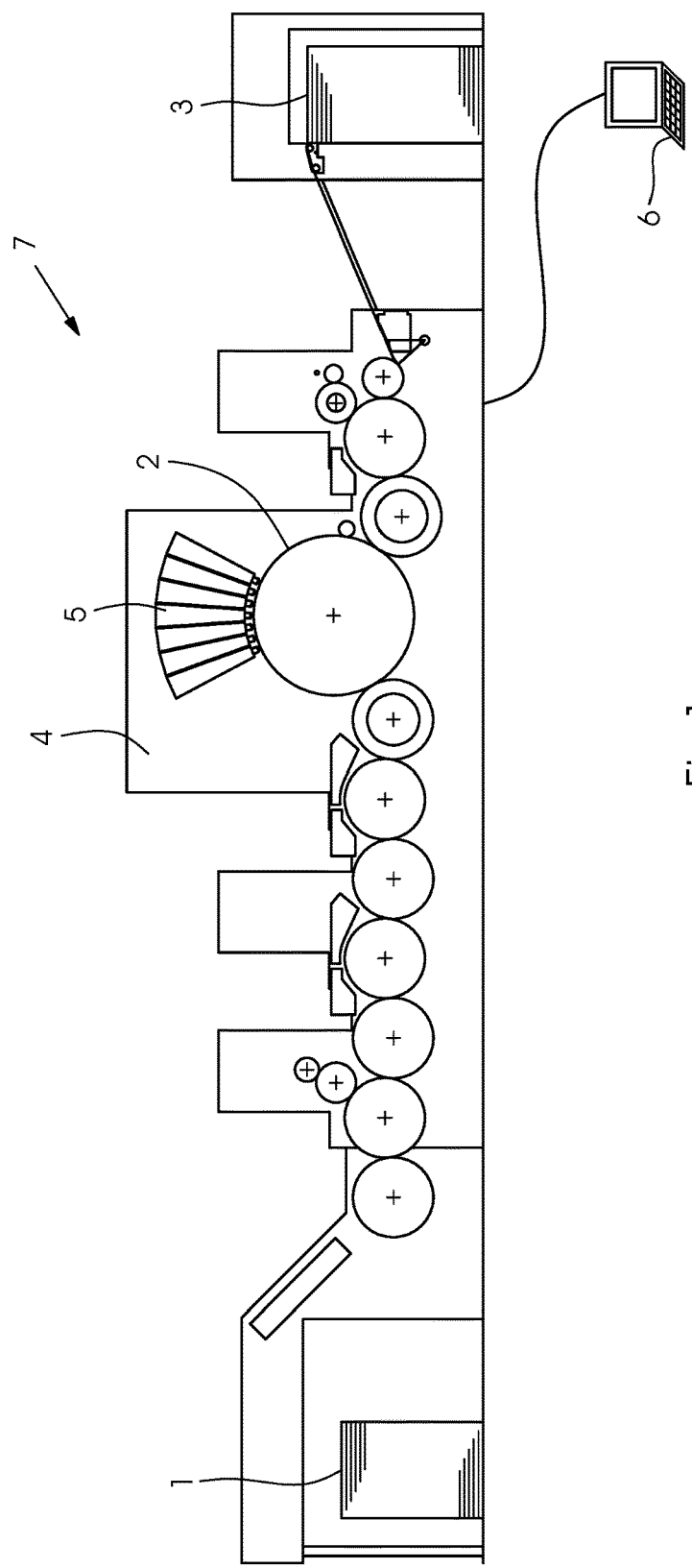
FIG. 1 is a diagrammatic, longitudinal-sectional view of an example of a digital inkjet printing machine.

Referring now in detail to the figures of the drawings, in which mutually corresponding elements have the same reference symbols, and first, particularly, to FIG. 1 thereof, there is seen an inkjet printing machine 7 which is representative of the field of application of the preferred exemplary embodiment of the invention. FIG. 1 shows an example of the fundamental structure of such a printing machine 7, including a feeder 1 for feeding a printing substrate 2 to a printing unit 4, where it receives an image printed by print heads 5, and a delivery 3. The machine is a sheet-fed inkjet printing machine 7 controlled by a control unit 6. However, the method of the invention may likewise be implemented in other types of digital printing machines 7.

Figure 2:
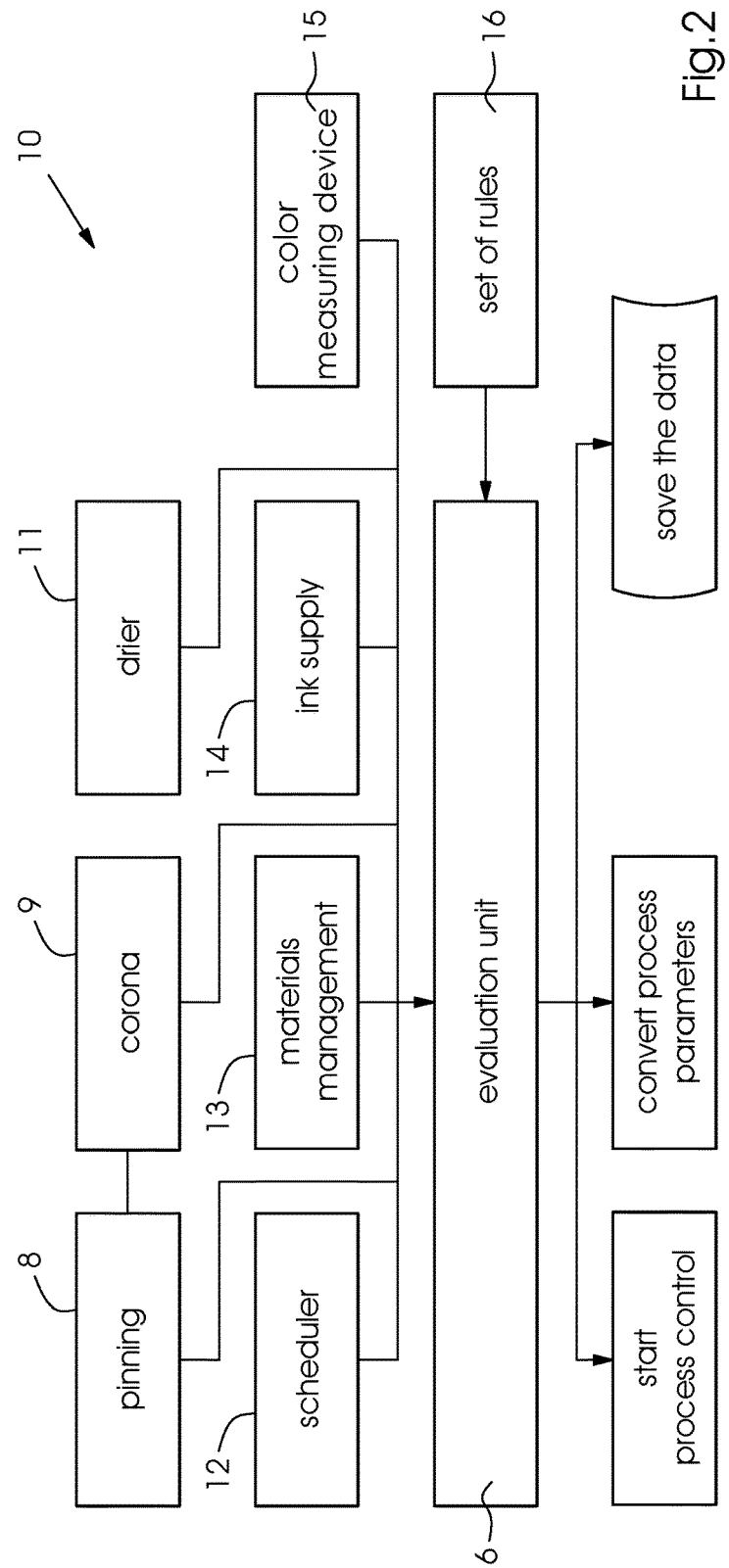
FIG. 2 is a diagram illustrating a structural correlation between process parameters, printing machine system components, and actions implemented in a corresponding way.

A structure of a printing machine system 10 used herein in terms of the structural correlation between process parameters, printing machine system components, and actions implemented in a corresponding way, is shown in FIG. 2. The process parameters or influencing variables of the printing machine system 10 are shown in an upper section of FIG. 2. They include individual HW or hardware components of the system 10 such as a pinning unit 8, a corona unit 9, a drier 11, and an ink supply 14, as well as computer-based control units in the form of a scheduler 12 and a materials management unit 13.

A further component is a color measurement device 15, which provides data on the color fidelity that has been achieved, i.e. on print quality.

A set of rules 16 is shown, the application of which determines the implementation of process control by the control unit 6.

The lower section lists the measures implemented in the context of process control.

Figure 3:
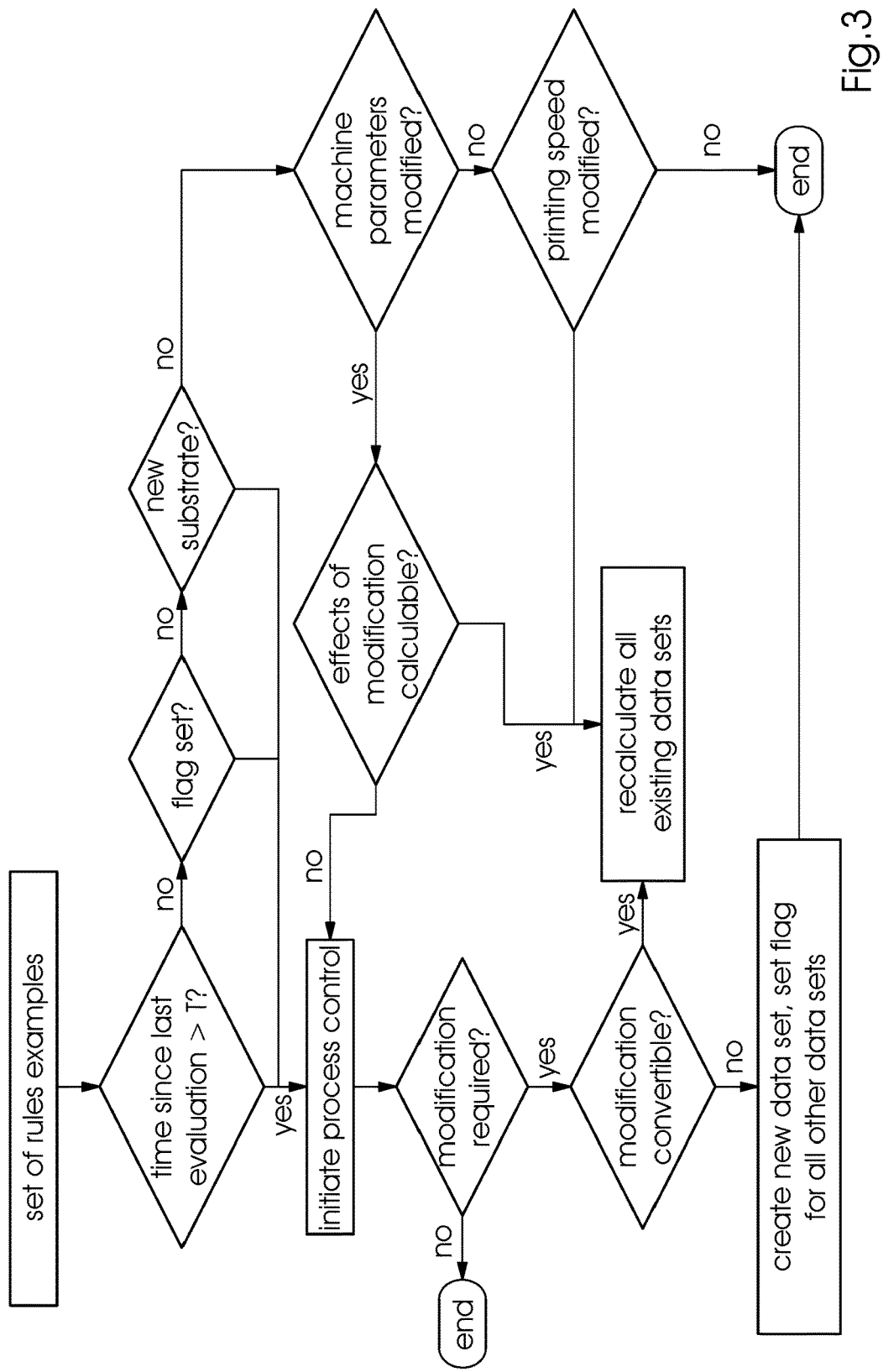
FIG. 3 is a flow chart illustrating a fundamental progression of the method of the invention.

FIG. 3 is a flow chart indicating the fundamental sequence of steps of the method of the invention. A first step is the application of the set of rules 16 including process parameters to be evaluated by the control unit 6. The sequence of actions of this step is shown in more detail in the first section of FIG. 3: the individual influencing parameters of the set of rules 16 are successively evaluated. These parameters include the time that has elapsed since the last evaluation, i.e. since the last application of the set of rules 16; a check whether a new substrate 2 is used, whether corresponding machine parameters have been changed that refer to the output of the drier 11, the corona 9, or the pinning 8, for instance, and whether the printing speed has been changed. At this point in the method, it is checked whether flags have been placed, which may occur in later steps of the method. This step will thus not become important until the second run of the control method of the invention.

If none of these parameters have been changed in a corresponding way, no process control is required. However, in cases in which a defined period of time has passed after the last evaluation, a flag has been set, or a new substrate 2 is used, process control will always be required. If only the machine parameters or the printing speed have been changed, it is checked whether the effects of the modified machine parameters are calculable, i.e. simulatable. If this is the case, the only measure is to adapt the existing data sets of the previous process controls in a corresponding way. If this is not the case, process control is required and will be initiated in a corresponding way.

If no modifications to the digital printing machine 7 are required for process control purposes, process control is immediately terminated without any further actions. If modifications are required, however, and if these modifications are incalculable, a new data set is created and a flag is set for the other sets of data. This flag will be checked in a renewed run of the method of the invention. Then actual process control starts. If by contrast the changes are calculable, no process control is carried out. Instead, a calculation is made and, based on the calculation, other existing data sets of the previous process controls are adapted in a corresponding way.

Figure 4:
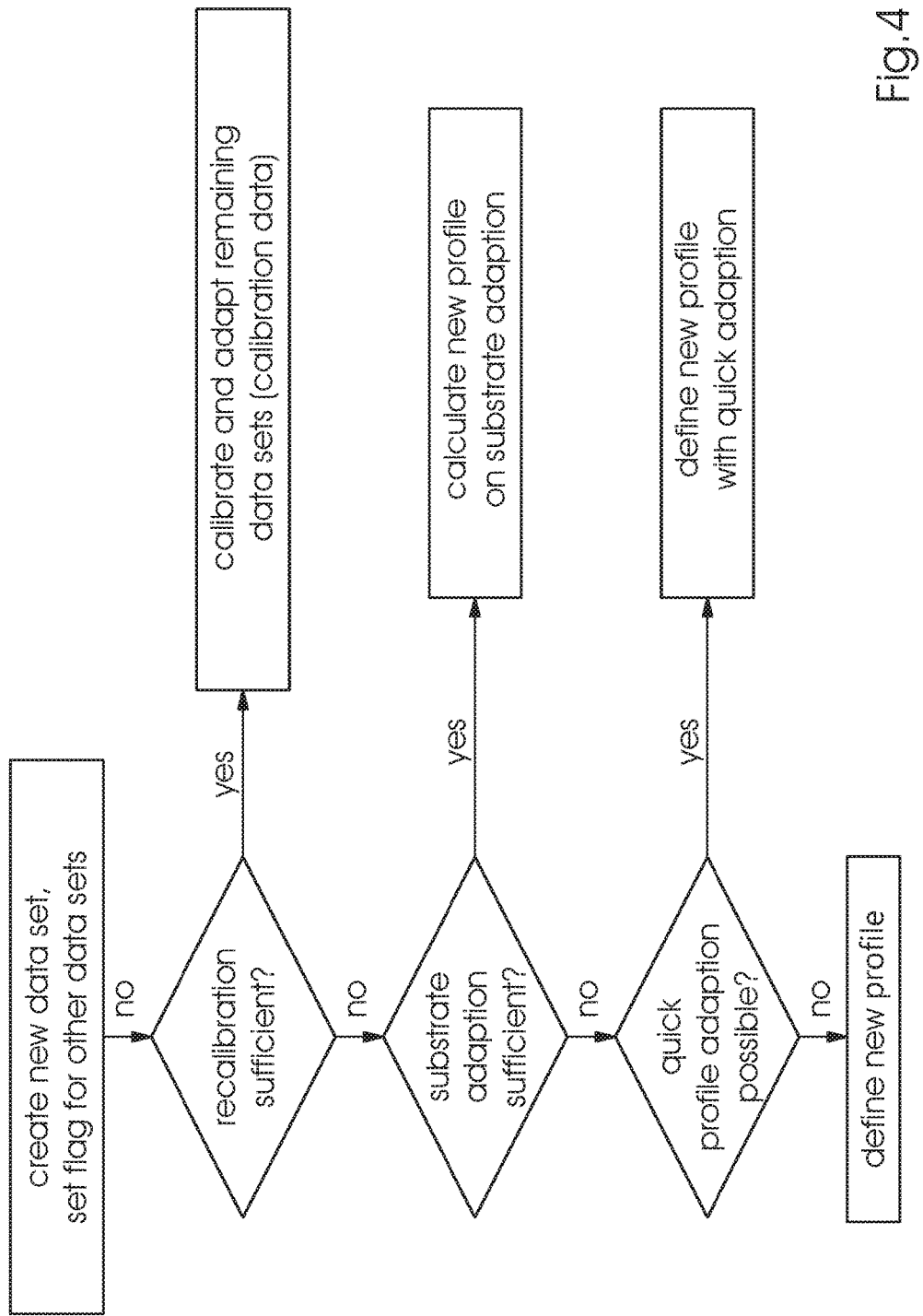
FIG. 4 is a flow chart illustrating a creation of a new data set for the actual process control.

The creation of the new data set for actual process control is illustrated in FIG. 4. In this case it is successively checked whether a recalibration of the digital printing machine 7, a substrate adaption, and a quick-action ICC profile adaption are sufficient as process control measures. If this is the case, the measures are taken in a corresponding way, i.e. a calibration is implemented and the remaining calibration data sets are adapted or a new profile on substrate adaption is calculated or a new profile on quick-action adaption is calculated and the actual process control is terminated. If all of this is not sufficient, a completely new ICC profile needs to be defined and created in the context of the actual process control. This is usually done by measuring the print and evaluating a test element.

Figure 5:
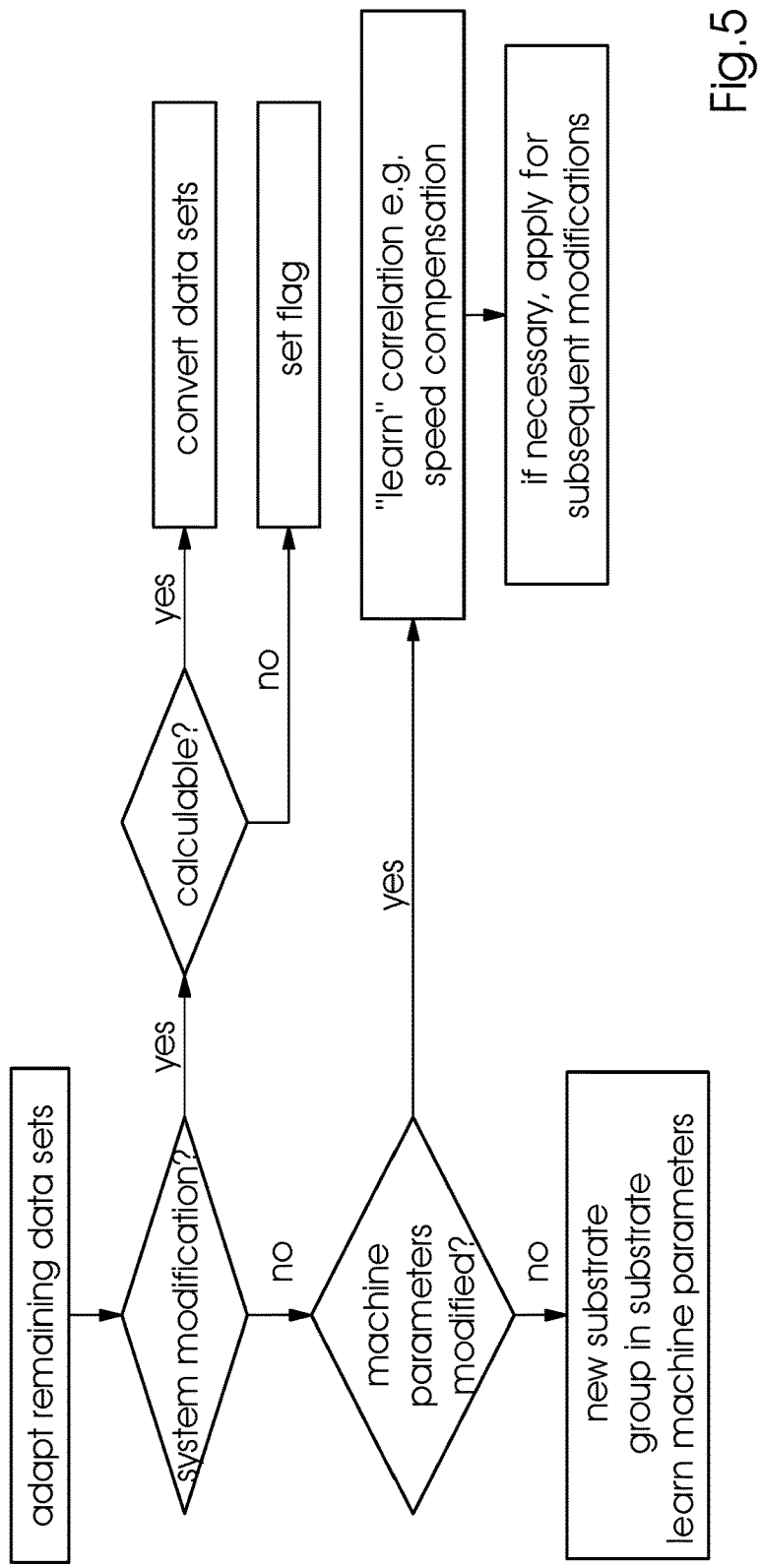
FIG. 5 is a flow chart illustrating an adaption of data sets in the context of a simulated process control.

The step of adapting the remaining calibration data sets of the previous process controls is illustrated in FIG. 5. The first action it includes is to check whether a system modification is required. If this is the case, it is checked whether this is calculable. If this is the case, the data sets are recalculated by applying the modified process parameters in a corresponding way. If the system modification is incalculable, a flag is set again. In this case, too, the flag causes a new process control to be started in a corresponding way whenever the next scheduled application of the set of rules 16 occurs rather than merely converting the existing data sets. This additional examination ensures that if it turns out in the further course of the method that a complete process control is required anyway, it is carried out upon the next implementation of the control process at the latest.

If no system modification is required, it is checked whether the machine parameters have been modified. If this is the case, the effects of the modified machine parameters are applied and adjusted in a suitable way. This includes speed compensation, for instance. The applied and adjusted effects are then applied to subsequent modifications if required. If no machine parameters have been modified and no system modifications have been made, but a new substrate is used, the new substrate is assigned a substrate class and the machine parameters for this new substrate 2 are applied and adjusted.

The preferred embodiment of the method of the invention thus describes a self-learning printing machine system 10 that continuously adapts to new circumstances by regular adaptions of the existing data sets and updates of the set of rules, allowing the calibration and operation of the digital printing machine 7 to be implemented as efficiently as possible.

The invention claimed is:

1. A method for an automated process control of a printing machine system by using a computer, the method comprising the following steps:
    applying a set of rules including process parameters from the printing machine to be examined by the computer to detect whether and when process control for the printing machine is required, and making values of the process parameters available to the computer by respective responsible components of the printing machine system;
    implementing process control by using the computer;
    evaluating results of the process control by using the computer;
    implementing actions deemed necessary based on the evaluation of the results by using the computer, wherein said actions include correcting the process parameters, recalculating calibration processes carried out in a course of the process control, recalculating International Color Consortium (ICC) profiles used in color management, as well as outputting information that a printing operation using the current process parameters is impossible; and
    saving established data of the implemented process control by using the computer.

2. The method according to claim 1, which further comprises:
    obtaining the process parameters from operation of the printing machine system; and
    selecting the parameters from the group consisting of an operating time elapsed since a last calibration of the printing machine system, a printing substrate being used, an ink being used, an applied drying power, a printing speed, a type of corona, a type of pinning and output color values of the printing machine system.

3. The method according to claim 2, which further comprises establishing the output color values of the printing machine system by using a color measurement device in a context of a color management process of the printing machine system.

4. The method according to claim 1, which further comprises selecting the responsible components of the printing machine system from the group consisting of a color measurement device, a drier, a materials management unit, an ink supply, a corona unit and a pinning unit.

5. The method according to claim 1, which further comprises:
    using the computer to save data established in a course of every process control being carried out in a data set in a database; and
    selecting the established data as values from the group consisting of process parameters, ICC profiles used in a context of color management, and calibration data for the printing machine system as well as updates of the set of rules.

6. The method according to claim 5, which further comprises if the computer does not carry out a process control after the application of the set of rules when process parameters have changed, using the computer to adapt all existing data sets of previous process controls to the modified process parameters.

7. The method according to claim 1, which further comprises carrying out the step of using the computer to implement the process control by:
    loading required test pages or individual test elements,
    outputting the test pages or individual test elements in an automated or semi-automated way, and
    measuring and evaluating a generated print output in an automated or semi-automated way.

8. The method according to claim 1, which further comprises carrying out the step of using the computer to evaluate the process control results by
    comparing actual and nominal values of the process parameters, and taking sensitivities for actual values and tolerances for target values into consideration.

9. The method according to claim 8, which further comprises:
    saving the evaluated process control results for all process parameters and optionally displaying the evaluated process control results for all process parameters on a display; and
    at least one of saving or displaying that tolerances have been met on the display in a corresponding way.

* * * * *